United States Patent [19]

Cenker et al.

[11] 3,969,288

[45] July 13, 1976

[54] CARBODIIMIDE-ISOCYANURATE FOAMS PREPARED FROM ACID-MODIFIED TOLUENE DIISOCYANATE

[75] Inventors: Moses Cenker, Trenton; Peter T. Kan, Plymouth, both of Mich.

[73] Assignee: BASF Wyandotte Corporation, Wyandotte, Mich.

[22] Filed: Oct. 2, 1974

[21] Appl. No.: 511,112

[52] U.S. Cl. .................... 260/2.5 BF; 260/2.5 AT; 260/2.5 AW; 260/453 SP; 260/471 C

[51] Int. Cl.² .................. C08G 18/02; C08G 18/12; C08G 18/14

[58] Field of Search .................. 260/2.5 AT, 2.5 BF, 260/2.5 AW, 453 SP, 471 C

[56] References Cited

UNITED STATES PATENTS

| | | | |
|---|---|---|---|
| 3,637,542 | 1/1972 | Doerge | 260/2.5 AJ |
| 3,759,916 | 9/1973 | Pitts | 260/2.5 AW |
| 3,781,235 | 12/1973 | Trott | 260/2.5 AW |
| 3,793,362 | 2/1974 | Kolakowski | 260/2.5 AW |
| 3,801,518 | 4/1974 | Irwin | 260/2.5 AT |

OTHER PUBLICATIONS

Advance Data Sheet, "Thanol R-350-X", Jefferson Chemical Co., Inc., pp. 1 and 12, July 19, 1965.

*Primary Examiner*—C. Warren Ivy
*Attorney, Agent, or Firm*—Bernhard R. Swick; Arnold S. Weintraub; Robert E. Dunn

[57] ABSTRACT

Acid-modified toluene diisocyanate is used to prepare rigid cellular foams characterized by carbodiimide linkages either by a one-shot process or a quasi-prepolymer process. The use of acid-modified toluene diisocyanate exhibits a more controllable reactivity with a one-shot foaming process and more stable quasi-prepolymers when using such systems.

8 Claims, No Drawings

CARBODIIMIDE-ISOCYANURATE FOAMS PREPARED FROM ACID-MODIFIED TOLUENE DIISOCYANATE

BACKGROUND OF THE INVENTION

1. Field of the Invention

The present invention pertains to rigid cellular foams characterized by carbodiimide linkages. More particularly, the present invention relates to the preparation of rigid cellular foams characterized by carbodiimide linkages by the catalytic condensation of an organic polyisocyanate. Even more particularly, the present invention concerns the preparation of rigid cellular foams characterized by carbodiimide linkages from the catalytic condensation of acid-modified toluene diisocyanate.

2. Prior Art

In copending U.S. patent application Ser. No. entitled "Urethane-Modified Carbodiimide-Isocyanurate Foams Prepared From TDI-Rich Isocyanates", filed the disclosure of which is hereby incorporated by reference, there is discussed the problems of using "pure or distilled" toluene diisocyanate, i.e., a 99% pure 80:20 weight mixture of 2,4- and 2,6-toluene diisocyanate, in the preparation of rigid cellular foams of the type under consideration herein. Furthermore, the referred to application teaches two methods for using pure toluene diisocyanate in the preparation of these foams. One such method disclosed therewithin comprises a two-step process wherein an active-hydrogen containing compound is reacted, in situ, with excess pure toluene diisocyanate, generally, in the presence of a urethane catalyst. This is followed by the catalytic condensation of the resulting product in the presence of a co-catalyst system. Comprising a carbodiimide catalyst and an isocyanate trimerization catalyst. The use of a two-step process is viable, but if a one-step or one-shot process could be employed many inherent processing advantages immediately arise.

The other method disclosed in the referred to application teaches the use of an isocyanate-terminated quasi-prepolymer prepared from an excess amount of pure toluene diisocyanate to produce the present foams. Although this method is quite efficacious, it has been found that when a reactive polyol is used to prepare the quasi-prepolymer, the quasi-prepolymers exhibit only limited storage stability. Thus, it would be advantageous to overcome this problem by providing quasi-prepolymers which are storage stable.

The present invention overcomes both of the herein considered problems.

SUMMARY OF THE INVENTION

In accordance with the present invention it has now been found that pure toluene diisocyanate can be efficaciously employed in the preparation of rigid cellular foams characterized by carbodiimide linkages using a one-shot method of preparation. Furthermore, it has, also, been discovered that storage stable isocyanate-terminated quasi-prepolymers prepared from a major amount of pure toluene diisocyanate, as the isocyanate component, can be obtained by the practice of the present invention.

The present invention contemplates the use of acid-modified pure toluene diisocyanate in the preparation of rigid cellular foams of the type under consideration herein. The acid-modified toluene diisocyanate can be used in a one-shot process by directly catalytically condensing same in the presence of a carbodiimide catalyst. The carbodiimide catalyst, preferably, is used conjointly with an isocyanate trimerization catalyst and a urethane catalyst. The use of a multiple or co-catalyst system provides carbodiimide linkages, isocyanurate groups and urethane groups in the resulting foams and, thereby, incorporates into the foam the beneficial properties of such groups.

Furthermore, the present invention contemplates the preparation of isocyanate-terminated quasi-prepolymers from an excess amount of organic polyisocyanate and, wherein, the polyisocyanate contains a major amount of acid-modified pure toluene diisocyanate. Such quasi-prepolymers exhibit storage stability, thereby, enhancing their utility in the preparation of the rigid cellular foams hereof.

Foams produced in accordance herewith exhibit improved flame retardancy properties and reduced friability as compared to foams prepared from pure toluene diisocyanate by the conventional one-shot methods.

For a more complete understanding of the present invention reference is made to the following detailed description and accompanying examples.

DESCRIPTION OF THE PREFERRED EMBODIMENTS

As hereinbefore noted, the present invention provides for the preparation of rigid cellular foams characterized by carbodiimide linkages using an acid-modified pure toluene diisocyanate (TDI). The foams hereof can be prepared by either a one-shot method or a quai-prepolymer method.

At the outset it is to be noted that as used herein, the term "pure TDI" refers to distilled crude toluene diisocyanate which is essentially 99% pure and which contains an 80:20 weight mixture of 2,4- and 2,6-toluene diisocyanate. Pure TDI, as defined herein, is a widely available commercial product. Furthermore, it should be noted that commercial pure TDI, generally, is adjusted in its manufacture, to contain either from about 20 to 50 parts per million of hydrogen chloride, or from about 80 to 120 parts per million of hydrogen chloride. The first type of pure TDI is of low acidity, and is referred to as TDI Type I. The second type of TDI is of high acidity, and is referred to as TDI Type II. Thus, commercial pure TDI does have some inherent acidity. However, acid-modified pure TDI as contemplated herein, contains many times the amounts of acid present in the commercially available products, and is distinct therefrom. Moreover, it should, also, be noted that in commercially available forms the predominant product is TDI Type I.

Moreover, and with respect to the present invention, the rigid cellular foams produced hereby, although being defined as characterized by carbodiimide linkages, i.e., $$-N=C=N-$$

contain other groups therewithin. There is present herewithin isocyanurate groups, urethane groups as well as free residual isocyanate. The urethane groups are specifically incorporated herewithin by the practice of the present invention. Thus, although the presence of the other groups is acknowledged, for purposes of brevity and clarity the present foams are referred to as carbodiimide foams.

As contemplated herein, pure TDI, and, preferably, TDI Type I, is rendered highly acidified by the addition thereto of an acidifying agent. The acidifying agent can be any conventional isocyanate acidifying agent, such as, hydrogen chloride, benzoyl chloride, other aromatic acyl halides, aliphatic acyl halides, and the like. Preferably, the acidifying agent is either hydrogen chloride or benzoyl chloride.

Generally, the pure TDI has added thereto from about 0.02% to about 0.5%, by weight, (as HCl) of the acidifying agent. Preferably, from about 0.025% to about 0.2%, by weight, (as HCl) based on the weight of the pure TDI, of acidifying agent is added to the isocyanate. By adding this quantity of acidifying agent it is to be appreciated that the acidity of the isocyanate is about ten to one hundred times the acidity level of commercial pure TDI.

From the acid-modified pure TDI as defined herein, it is possible to prepare carbodiimide foams by either the one-shot method or from storage stable quasi-prepolymers, in a manner subsequently described. It should be noted in this regard that pure TDI having the acid levels hereof are considered too acidic or unreactive for urethane foam applications. Yet, when employed in the preparation of carbodiimide foams, all the inherent disadvantages relative to friability and flame retardancy properties, attendant such pure TDI-based foams, when prepared by a conventional one-shot process are completely overcome.

Although not wishing to be bound by any theory, it is presumed that the high acid levels of the isocyanate to some extent tend to neutralize the basic carbodiimide amine catalysts. This modifies their catalysis for trimerization and carbodiimide formation. Any urethane catalysts present in the system are not nearly so affected. Thus, the rate of urethane formation is not altered or retarded in the presence of the acid. Thus, the resulting polymeric foams have desirable levels of urethane linkages incorporated into the trimer and carbodiimide structures. Thus, the present invention enables the use of a one-shot process for the preparation of carbodiimide foams.

With respect to the improvement of storage stability attendant the use of quasi-prepolymers, the same reasoning, pointed out above, is equally applicable herein. Ordinarily, reactive polyols tend to react with free isocyanate to promote allophanate and trimer formation. The presence of the acid in the isocyanate tends to moderate the reactivity of the isocyanate groups by somewhat neutralizing the basic species which are potential catalysts for such reactions. By the acid functioning as a neutralizing agent, the storage stability of the quasi-prepolymers is, thus, increased.

In preparing the carbodiimide foams using the acid-modified pure TDI, either in the one-shot process or the quasi-prepolymer process, the isocyanate can be used alone or in admixture with another organic polyisocyanate. Representative of the other type of organic polyisocyanates useful herein are those which correspond to the formula:

$$R(NCO)_z$$

wherein R is a polyvalent organic radical selected from the group of aliphatic, aromatic, arylalkyl and alkylaryl organic radicals, as well as mixtures thereof; and Z is an integer corresponding to the valence number of R and is at least 2. Representative of the organic polyisocyanates contemplated herein include for example, the aromatic diisocyanates, such as 2,4-toluene diisocyanate, 2,6-toluene diisocyanate, mixtures of 2,4- and 2,6-toluene diisocyanate to change the isomer ratio in the pure or distilled TDI, crude toluene diisocyanate, methylene diphenyl diisocyanate, crude methylene diphenyl diisocyanate and the like; the aromatic triisocyanates such as 4, 4',4''-triphenylmethylene triisocyanate, such as 4,4'-dimethyldiphenylmethane-2,2',5,5'-tetraisocyanate and the like, aralkyl polyisocyanates, such as xylylene diisocyanate; aliphatic polyisocyanates, such as hexamethylene-1,6-diisocyanate, lysine diisocyanate methylester and the like, and mixtures thereof. Other useful organic polyisocyanates include:

polymethylene polyphenylisocyanate,
hydrogenated methylene diphenylisocyanate,
m-phenylene diisocyanate,
naphthylene-1,5-diisocyanate,
1-methoxyphenyl-2,4-diisocyanate,
diphenylmethane-4,4'-diisocyanate,
4,4'-biphenylene diisocyanate,
3,3'-dimethoxy-4,4'-biphenyl diisocyanate,
3,3'-dimethyl-4,4'-biphenyl diisocyanate, and
3,3'-dimethyldiphenylmethane-4,4'-diisocyanate,
and the like.

These polyisocyanates are prepared by conventional methods in the art such as the phosgenation of the corresponding organic amine.

Still another class of organic polyisocyanates useful herein are isocyanate-terminated quasi-prepolymers. These quasi-prepolymers are prepared by reacting excess organic polyisocyanate or mixtures thereof with a minor amount of an active hydrogen-containing compound. Suitable active-hydrogen containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxy-terminated polyurethane polymers, polyhydric polythioethers, alkylene oxide adducts of phosphorus-containing acids, polyacetals, aliphatic polyols, aliphatic thiols including alkane, alkene and alkyne thiols having two or more -SH groups; as well as mixtures thereof. Compounds which contain two or more different groups within the above-defined classes may also be used such as, for example, compounds which contain one —SH group and one —OH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutanconic acid, α-hydromuconic acid, β-hydromuconic acid, butyl-α-ethyl-β glutaric acid, α,β-diethylsuccinic acid, isophthalic acid, terephthalic acid, hemimellitic acid, and 1,4-cyclohexanedicarboxylic acid. Any suitable polydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane- 1,2,6-triol, α-methyl glucoside, pentaerythritol, and sorbitol. Also included with the term "polyhydric alcohol" are compounds derived from phenol such as 2,2-bis(4-hydroxyphenyl)propane, commonly known as Bisphenol A.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, anylene oxide, and heteric or block copolymers of these oxides. The polyalkylene polyether polyols may be prepared from other starting materials such as tetrahydrofuran, alkyene oxidetetrahydrofuran mixtures, epihalohydrins such as epichlorohydrin, as well as aralkylene oxides such as styrene oxide. The polyalkylene polyether polyols may have either primary or secondary hydroxyl groups, and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1957) or in U.S. Pat. No. 1,992,459.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two -SH groups may be used such as 1, 2-ethane dithiol, 1,2-propane dithiol, 1,3-propane dithiol, and 1,6-hexane dithiol, alkene thiols such as 2-butene-1, 4-dithiol, and alkyne thiols such as 3-hexyne-1, 6-dithiol.

Other compounds which do not necessarily fit within any of the previously set forth classes of compounds which are quite suitable in the production of these other quasi-prepolymers compounds include the hydroxy-terminated polyurethane polymers such as a hydroxy-terminated polymer made by reacting the isocyanate with several moles of an alkylene glycol.

In using mixtures of organic polyisocyanate it is contemplated that such mixtures contain more than fifty percent, by weight, of the acid-modified pure TDI.

Moreover, within the broad class of useful polyisocyanates it is preferred to employ either the acid-modified pure TDI, alone, or in admixture with crude methylene diphenyl diisocyanate.

As described in the aforementioned copending application pure TDI can be efficaciously deployed in the preparation of carbodiimide foams using isocyanate-terminated quasi-prepolymers thereof. In accordance with the method defined in the copending application, the pure TDI thereof is replaced with the acid-modified pure TDI hereof. All other aspects of the quasi-prepolymer technique remain the same.

The carbodiimide foams hereof are prepared by reacting the acid-modified pure TDI-rich quasi-prepolymer or acid-modified pure TDI, as defined herein, in the presence of a catalytically sufficient amount of a co-catalyst system comprising a carbodiimide catalyst and an isocyanate trimerization catalyst. Additionally, a urethane catalyst is, optionally, employed.

When utilized, the co-catalyst system is employed in a weight ratio to urethane catalyst of from about 1:1 to about 6:1, and preferably, from about 2:1 to about 4:1. Also, the carbodiimide catalyst and isocyanate trimerization catalyst are employed in a, respective, weight ratio of from about 7:1 to 1:7, and, preferably, from about 3:1 to about 5:1.

Useful carbodiimide catalysts include those described in U.S. Pat. Nos. 3,806,475, 3,645,923, 3,824,240, and 3,824,239, the disclosures of which are hereby incorporated by reference. Other useful catalysts are disclosed in U.S. patent application Ser. No. 118,994, the disclosure of which is, also, incorporated by reference. Thus, any known carbodiimide catalyst can be used herein.

The useful isocyanate trimerization catalysts contemplated herein, are, also, any of the well-known isocyanate trimerization catalysts. Thus, the trimerization catalysts disclosed in U.S. Pat. Nos. 3,766,103; 3,723,366, and U.S. Pat. No. 3,717,596 are efficaciously deployed herein.

A particularly preferred co-catalyst system comprises 2,4-bis(diethylamino)-6(N-methylethanolamino)-s-triazine (DMT) as the carbodiimide catalyst and 1,3,5-tris(3-dimethylaminopropyl)-s-hexahydrotriazine as the trimerization catalyst.

Any suitable urethane catalyst can be used herein, such as tertiary amines and metallo-organic salt catalyst which are polyvalent metal salts of an organic acid having up to about eighteen carbon atoms and being void of active hydrogen atoms. The organic portion of salt may be either linear or, cyclic, saturated or unsaturated. The polyvalent metal has a valence of from about 2 to 4.

Representative tertiary amines include, for example, diethylene triamine ketimine, tetramethylethylene diamine, triethylene diamine, tetramethylbutane diamine, tetramethyl guanidine, trimethyl piperazine and the like.

Typical organo-metallic salt catalysts include stannous acetate, stannous butyrate, stannous 2-ethylhexoate, stannous laurate, stannous oleate, stannous stearate, lead cyclopentane carboxylate, cadmium cyclohexane carboxylate, lead naphthenate, lead octoate, cobalt naphthenate, zinc naphthenate, bis (phenyl mercury) dodecyl succinate, phenyl mercuric benzoate, cadmium napthenate, dibutyltin dilaurate, dibutyltin diacetate, and dibutyltin-di-2-ethylhexoate.

Generally, the catalyst is employed in an amount ranging from about 0.5 to about 15 parts, by weight, based on the weight of the active hydrogen-containing compound, and, preferably, from about 5 to 15 parts by weight, based on 100 parts by weight of the active hydrogen-containing compound.

The carbodiimide foams are prepared by admixing the ingredients together at a temperature of about 25°C or below. At this temperature the condensation reaction commences.

In preparing the foams hereof additional ingredients can be incorporated into the foam formulation to tailor the properties thereof. Thus, plasticizers, such as tris(2-chlorethyl) phosphate; surfactants, such as the silicone surfactants, e.g., alkylpolysiloxanes and polyalkyl siloxanes; active hydrogen-containing compounds, such as those hereinbefore enumerated, can be employed in the practice hereof. Further additional ingredients include auxiliary or supplemental blowing agents, such as water or halohydrocarbons, inorganic fillers, pigments and the like. The additional ingredients can be incorporated herein by any suitable technique, such as those disclosed in the hereinbefore referred to patents.

The products hereof are rigid cellular foams containing carbodiimide, isocyanurate and urethane groups therewithin. The foams have a density of from about one to three pounds per cubic foot. The foams exhibit low friability, excellent flame retardancy and compressive strength.

Following are specific, non-limiting examples of the present invention. In the examples, which are illustrative of the principles set forth herein, all parts are by weight absent indications to the contrary.

EXAMPLE I

This example illustrates the preparation of acid-modified pure TDI.

Into a suitable vessel equipped with stirring means was charged 4000 parts of pure TDI Type I. With stirring there was then added thereto 20 parts (0.548 moles) of anhydrous gaseous hydrogen chloride to provide an acid-modified pure TDI containing 0.5% HCl. The acidity was analyzed as 0.46% HCl or 0.49% as hydroyzable Cl.

The so-prepared acid-modified pure TDI was then reserved as a stock solution.

From the stock solution was, then, divided out 100 part quantities thereof. Each of the 100 part quantities then had added thereto pure TDI Type I to dilute the acid-modified pure TDI to acid-modified pure TDI containing, respectively, 0.025%, 0.05%, 0.1% and 0.2% acid.

The procedure outlined above was repeated, but utilizing 77 parts (0.548 moles) of benzoyl chloride added to 3923 parts of TDI Type I. The stock solution was then divided into 100 part quantities and diluted down, as described hereinbefore.

EXAMPLE II

This example illustrates the storage stability of isocyanate-terminated quasi-prepolymers utilizing acid-modified pure TDI.

Into a suitable vessel equipped with stirring means was charged 100 parts of pure TDI Type I. Under a nitrogen blanket and with stirring there was, then, slowly added thereto five parts of a triol having a typical hydroxyl value of 520–540 and derived from phenol, formaldehyde, diethanolamine, and propylene oxide, sold commercially by Jefferson Chemical under the name THANOL R-350X, which is a highly reactive active hydrogen-containing compound. The temperature in the vessel was permitted to rise spontaneously. At the conclusion of the addition, stirring was continued until the mixture in the vessel reached room temperature.

The so-prepared quasi-prepolymer was, then, visually observed for changes. Upon a visual observation of change there was, thus, indicated an alteration of storage stability.

The procedure outlined above was, then, repeated utilizing quasi-prepolymers prepared from 100 parts of pure TDI Type I and 10, 15, 20 and 25 parts, respectively, of the active-hydrogen containing compound. Then, further series of quasi-prepolymers were prepared using the 0.025%, 0.05% and 0.10% hydrogen chloride acid-modified pure TDI as well as the 0.05%, 0.10% and 0.20% benzoyl chloride acid-modified pure TDI.

The following table, Table I, sets forth the data obtained from the visual observation:

TABLE I

| ISOCYANATE | Days Before Visual Change 5 | 10 | 15 | 20 | 25 | Active Hydrogen Compound, amt. |
|---|---|---|---|---|---|---|
| Type I | 5 | 4 | 2 | 0 | 0 | |
| 0.025% HCl | >20 | 20 | 14 | 12 | 11 | |
| 0.05% HCl | >38 | 26 | 21 | 17 | 15 | |
| 0.10% HCl | >37 | >37 | 33 | 27 | 20 | |
| 0.05% φCOCl | 30 | 18 | 13 | 12 | 10 | |
| 0.10% φCOCl | >27 | 27 | 17 | 16 | 14 | |
| 0.20% φCOCl | >32 | >32 | 32 | 28 | 28 | |

From the above data the dramatic improvement in storage stability of the quasi-prepolymer becomes readily apparent.

EXAMPLE III

A series of urethane-modified carbodiimide foams were prepared from acid-modified pure TDI by a one-shot process. The procedure employed was as follows:

Into a suitable reaction vessel was charged 100 parts of organic polyisocyanate containing a major amount of acid-modified pure TDI. There was then added to the isocyanate, with stirring, a pre-blend of varying amounts of active hydrogen-containing compound, carbodiimide catalyst, isocyanate trimerization catalyst and urethane catalyst. Also, incorporated into the pre-blend were varying amounts of an auxiliary blowing agent, as well as 1 part of tris(2-chloroethyl) phosphate, a plasticizer, and 0.5 part of a polysiloxane surfactant sold by Dow Chemical under the name DC-193. The condensation reaction was initiated at 10°C, as evidenced by the evolution of carbon dioxide and the formation of foam in the vessel.

In preparing the first eleven samples of foams, a 0.1% hydrogen chloride acid-modified pure TDI was utilized. The other fourteen samples were prepared utilizing a 0.2% benzoyl chloride acid-modified pure TDI.

The following table, Table II, sets forth the ingredients and amounts thereof used to prepare the foams.

TABLE II

| Sample | Acid-Modified TDI | CMDI[1] | POLYOL[2] | DMT[3] | Urethane Catalyst[4] | TDH[5] | Blowing Agent[6] |
|---|---|---|---|---|---|---|---|
| 1 | 100 | — | 10 | 2 | 1 | 0.5 | — |
| 2 | 90 | 10 | 10 | 3 | 1 | 0.5 | 3 |
| 3 | 80 | 20 | 15 | 3 | 2 | 1 | 5 |
| 4 | 80 | 20 | 20 | 3 | 2 | 1 | 6 |
| 5 | 80 | 20 | 25 | 3 | 2 | 1 | 7 |
| 6 | 70 | 30 | 15 | 3 | 2 | 1 | 7 |
| 7 | 70 | 30 | 20 | 3 | 2 | 1 | 7 |
| 8 | 70 | 30 | 25 | 3 | 2 | 1 | 7 |
| 9 | 60 | 40 | 15 | 3 | 2 | 1 | 7 |
| 10 | 60 | 40 | 20 | 3 | 2 | 1 | 8 |
| 11 | 60 | 40 | 25 | 3 | 2 | 1 | 9 |
| 12 | 100 | — | 10 | 3 | 2 | 0.5 | — |
| 13 | 100 | — | 15 | 3 | 1 | 1 | — |
| 14 | 90 | 10 | 10 | 3 | 1 | 1 | 3 |
| 15 | 90 | 10 | 15 | 3 | 1 | 1 | 3 |
| 16 | 90 | 10 | 20 | 3 | 1 | 1 | 3 |
| 17 | 80 | 20 | 15 | 3 | 2 | 1 | 5 |
| 18 | 80 | 20 | 20 | 3 | 2 | 1 | 7 |
| 19 | 80 | 20 | 25 | 3 | 2 | 1 | 7 |
| 20 | 70 | 30 | 15 | 3 | 2 | 1 | 7 |
| 21 | 70 | 30 | 20 | 3 | 2 | 1 | 7 |
| 22 | 70 | 30 | 25 | 3 | 2 | 1 | 7 |
| 23 | 60 | 40 | 15 | 3 | 2 | 1 | 8 |
| 24 | 60 | 40 | 20 | 3 | 2 | 1 | 8 |
| 25 | 60 | 40 | 25 | 3 | 2 | 1 | 9 |

[1]Crude methylene diphenyl diisocyanate
[2]THANOL R-350X
[3]2,4-bis(diethylamino)-6-(N-methylethanolamino-s-triazine, as carbodiimide catalyst
[4]dibutyltin dilaurate
[5]1,3,5-tris(3-dimethylaminopropyl)-s-hexahydrotriazine, a trimer catalyst
[6]fluorotrichloromethane, stabilized Samples 1–25 were then tested for physical properties in accordance with the following test procedure:

| | | |
|---|---|---|
| Compressive Strength, 10% Defl. psi. | ASTM | D-1621 |
| Tumbling Friability, % Wt. Loss | ASTM | C-421 |
| Butler Chimney Test | ASTM | D-3014 |

Table III, below, sets forth the results of these tests:

TABLE III

| Sample | Den. pcf. | Comp. Str. 10% Def. psi. | Tumb. Friab. % Wt. Loss | Wt. Ret. % | Butler Chimney Test Flame Ht. in. | Butler Chimney Test Time To Sx. sec. |
|---|---|---|---|---|---|---|
| 1 | 1.7 | 18.3 | 44 | 48 | 10 | 18 |
| 2 | 2.3 | 26.2 | 67 | 85 | 9 | 14 |
| 3 | 1.6 | 11.4 | 59 | 59 | 10 | 23 |
| 4 | 1.9 | 16.9 | 45 | 63 | 10 | 17 |
| 5 | 1.8 | 17.8 | 49 | 65 | 10 | 17 |
| 6 | 1.7 | 20.7 | 38 | 57 | 10 | 20 |
| 7 | 2.0 | 19.8 | 39 | 66 | 10 | 14 |
| 8 | 2.1 | 23.4 | 38 | 63 | 10 | 17 |
| 9 | 2.0 | 19.5 | 40 | 76 | 10 | 13 |
| 10 | 2.0 | 24.2 | 42 | 70 | 10 | 16 |
| 11 | 1.7 | 12.3 | 32 | 45 | 10 | 27 |
| 12 | 1.6 | 13.9 | 51 | 51 | 10 | 31 |
| 13 | 1.8 | 13.2 | 50 | 43 | 10 | 33 |
| 14 | 1.6 | 12.3 | 59 | 76 | 10 | 11 |
| 15 | 1.9 | 18.8 | 52 | 69 | 10 | 13 |
| 16 | 2.1 | 17.2 | 50 | 59 | 10 | 24 |
| 17 | 2.0 | 16.1 | 43 | 54 | 10 | 29 |
| 18 | 1.8 | 13.3 | 53 | 58 | 10 | 15 |
| 19 | 2.2 | 18.5 | 48 | 66 | 10 | 15 |
| 20 | 2.0 | 21.2 | 44 | 74 | 10 | 13 |
| 21 | 2.3 | 23.4 | 41 | 61 | 10 | 22 |
| 22 | 2.2 | 20.0 | 54 | 63 | 10 | 28 |
| 23 | 2.0 | 21.0 | 32 | 77 | 10 | 11 |
| 24 | 2.0 | 17.4 | 49 | 48 | 10 | 26 |
| 25 | 2.0 | 19.3 | 40 | 48 | 10 | 26 |

EXAMPLE V

This example illustrates the preparation of urethane-modified carbodiimide foams from isocyanate-terminated quasi-prepolymers of acid-modified pure TDI.

Following the procedure of Example II, a series of quasi-prepolymers were prepared from 100 parts of acid-modified pure TDI and varying amounts of the THANOL R-350X polyol.

Into a suitable reaction vessel equipped with stirring means was charged the quasi-prepolymer. To the quasi-prepolymer was, then, added, with stirring, a blend of carbodiimide catalyst, isocyanate trimerization catalyst and urethane catalyst. Admixed with the catalyst blend were an auxiliary blowing agent, in varying amounts, as well as one part of tris(2-chloroethyl) phosphate, as a plasticizer, and 0.5 parts of a siloxane surfactant sold commercially by Dow Chemical under the name DC-193. The resulting mixture was stirred at 25°C until the condensation reaction began, as evidenced by the evolution of carbon dioxide and foam formation in the vessel.

The ingredients and amounts thereof used to prepare the foams are set forth in Table IV, below:

TABLE IV

| Sample | %HCl | Polyol | DMT | Urethane Catalyst | TDH | Blowing Agent |
|---|---|---|---|---|---|---|
| A. HCl Modified TDI | | | | | | |
| 26 | 0.1 | 5 | 2 | 1 | 1 | — |
| 27 | 0.05 | 5 | 2 | 1 | 0.5 | — |
| 28 | 0.1 | 10 | 3 | 1 | 1.5 | 7.5 |
| 29 | 0.025 | 10 | 3 | 1 | 1.5 | 6 |
| 30 | 0.1 | 15 | 3 | 1 | 2 | 12 |
| 31 | 0.05 | 15 | 3 | 1 | 2 | 12 |
| 32 | 0.1 | 20 | 3 | 1 | 2 | 18 |
| 33 | 0.05 | 20 | 3 | 1 | 2 | 18 |
| 34 | 0.1 | 25 | 3 | 1 | 2 | 18 |
| 35 | 0.05 | 25 | 3 | 1 | 2 | 20 |
| B. Benzoyl Chloride Modified TDI | | | | | | |
| 36 | 0.2 | 5 | 3 | 1 | 1.5 | — |
| 37 | 0.05 | 5 | 3 | 1 | 1.5 | — |
| 38 | 0.2 | 10 | 3 | 1 | 1.5 | 5 |
| 39 | 0.1 | 10 | 3 | 1 | 1.5 | 6 |

TABLE IV-continued

| Sample | %HCl | Polyol | DMT | Urethane Catalyst | TDH | Blowing Agent |
|---|---|---|---|---|---|---|
| 40 | 0.2 | 15 | 3 | 1 | 2 | 12 |
| 41 | 0.1 | 15 | 3 | 1 | 2 | 12 |
| 42 | 0.2 | 20 | 3 | 1 | 2 | 18 |
| 43 | 0.1 | 20 | 3 | 1 | 2 | 18 |
| 44 | 0.2 | 25 | 4 | 1 | 3 | 20 |

Following the procedure of Example IV, the foams of samples 26–44 were tested for physical properties. The results of these tests are set forth hereinafter in Table V:

TABLE V

| Sample | Den. pcf. | Comp. Str. 10% Def. psi. | Tumb. Friab. % Wt. Loss | Closed Cell Cont. % | Butler Chimney Test Wt. Ret. % | Flame Ht. in. | Time To SX sec. |
|---|---|---|---|---|---|---|---|
| 26 | 1.6 | 16.3 | 33 | 2 | 81 | 10 | 11 |
| 27 | 1.7 | 20.1 | 31 | 4 | 84 | 9 | 10 |
| 28 | 1.8 | 22.8 | | | 75 | 9 | 10 |
| 29 | 2.0 | 22.9 | | | 79 | 10 | 11 |
| 30 | 2.1 | 33.0 | | | 89 | 8 | 10 |
| 31 | 2.1 | 36.5 | 44 | 2 | 85 | 9 | 10 |
| 32 | 1.9 | 37.2 | 31 | 101 | 66 | 10 | 18 |
| 33 | 2.3 | 37.4 | | | 65 | 10 | 13 |
| 34 | 2.4 | 40.2 | 20 | 102 | 59 | 10 | 19 |
| 35 | 2.7 | 45.8 | | | 58 | 10 | 23 |
| 36 | 1.6 | 15.8 | 42 | 2 | 77 | 10 | 12 |
| 37 | 1.9 | 19.9 | 40 | 3 | 80 | 10 | 10 |
| 38 | 2.1 | 25.5 | 32 | 6 | 75 | 10 | 19 |
| 39 | 2.1 | 30.1 | 32 | 7 | 76 | 10 | 17 |
| 40 | 2.2 | 41.3 | | | 86 | 10 | 10 |
| 41 | 2.3 | 36.2 | 25 | 102 | 84 | 10 | 11 |
| 42 | 2.0 | 25.3 | 24 | 103 | 75 | 10 | 13 |
| 43 | 2.4 | 41.4 | | | 68 | 10 | 18 |
| 44 | 2.3 | 36.8 | 25 | 101 | 57 | 10 | 21 |

It can be seen from the above, that the present invention provides a means whereby pure TDI can be effectively employed in a one-shot process for the preparation of carbodiimide foams, as well as providing stable quasi-prepolymers for the preparation of such foams.

Having thus described the invention what is sought and desired to secure by Letters Patent is:

1. In a process for the preparation of a rigid cellular foam characterized by carbodiimide linkages wherein an organic polyisocyanate is catalytically condensed in the presence of a catalytically sufficient amount of a carbodiimide catalyst, the improvement which comprises:

employing as the organic polyisocyanate commercial pure toluene diisocyanate which has been acid-modified by adding an excess amount of a conventional acidifying agent to achieve an acidity level of a minimum of about ten times the acidity level of the commercial pure toluene diisocyanate.

2. The process of claim 1 wherein the toluene diisocyanate is employed as an isocyanate-terminated quasi-prepolymer to prepare therefrom a urethane-modified rigid cellular foam characterized by carbodiimide linkages.

3. The process of claim 1 wherein the toluene diisocyanate is used alone or in admixture with another organic polyisocyanate, the admixture containing a major amount of the toluene diisocyanate.

4. The process of claim 1 wherein the toluene diisocyanate contains from about 0.02% to about 0.5%, by weight, based on the weight of the polyisocyanate, of the acidifying agent.

5. The process of claim 4 wherein the acidifying agent is selected from the group consisting of hydrogen chloride and benzoyl chloride.

6. The process of claim 1 wherein the toluene diisocyanate is employed in admixture with an active hydrogen-containing compound to provide a urethane-modified rigid cellular foam characterized by carbodiimide linkages.

7. The process of claim 6 wherein the admixture is catalytically condensed in the presence of a catalytic system comprising a carbodiimide catalyst, an isocyanate trimerization catalyst and a urethane catalyst.

8. A storage stable isocyanate-terminated quasi-prepolymer for use in the process of claim 1 consisting essentially of:

a. an excess amount of the acid-modified commercial pure toluene diisocyanate as defined in claim 1, and b. an active hydrogen-containing compound consisting essentially of a phenol, formaldehyde, diethanolamine, and propylene oxide derived triol.

* * * * *